(12) United States Patent
Liu et al.

(10) Patent No.: US 8,170,796 B2
(45) Date of Patent: May 1, 2012

(54) INS BASED GPS CARRIER PHASE CYCLE SLIP DETECTION AND REPAIRING

(75) Inventors: Gang Kevin Liu, Simi Valley, CA (US); Robert John Buchler, Calabasas, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 437 days.

(21) Appl. No.: 12/454,580

(22) Filed: May 20, 2009

(65) Prior Publication Data
US 2010/0299066 A1 Nov. 25, 2010

(51) Int. Cl.
*G01C 21/00* (2006.01)
(52) U.S. Cl. ... 701/468; 701/410; 701/409; 342/357.32; 342/357.42

(58) Field of Classification Search .................. 701/214, 701/213, 216, 215, 207; 342/357.32, 357.34, 342/357.29, 357.42
See application file for complete search history.

(56) References Cited

U.S. PATENT DOCUMENTS
2002/0120400 A1\* 8/2002 Lin ............................... 701/214
2007/0032950 A1\* 2/2007 O'Flanagan et al. ......... 701/214
\* cited by examiner

*Primary Examiner* — Behrang Bandii
(74) *Attorney, Agent, or Firm* — Carmen Patti Law Group, LLC

(57) ABSTRACT

An apparatus comprising a position system configured to determine a global positioning (GPS) change vector, and an inertial navigation system (INS) change vector. The position system is configured to determine a relative position between a first platform and a second platform based on the GPS change vector and the INS change vector, and the position system is configured to correct a GPS position calculation error based on the GPS change vector and the INS change vector.

20 Claims, 3 Drawing Sheets

INS BASED GPS CARRIER PHASE CYCLE SLIP DETECTION AND REPAIRING

TECHNICAL FIELD

The invention relates generally to the use of an inertial navigation system (INS) in detecting and correcting global positioning system (GPS) location calculation errors, and more particularly to the use of INS in GPS cycle slip detection and repairing.

BACKGROUND

As GPS systems become more accurate, GPS is used for more location related applications. For example, motorists now commonly use GPS systems as navigation aids. Vehicle fleets, such as taxis, school buses or police and fire may be tracked using GPS. Surveyors may also use GPS as a tool of the trade. Location systems like GPS may be used in more mission critical applications as the accuracy of the system improves.

In essence, a GPS unit determines its current position by determining a distance between the GPS unit and GPS satellites that transmit signals. This difference is typically determined through either code phase resolution or carrier phase resolution. Code phase resolution involves measuring the distance between a GPS receiver and a transmitting GPS satellite by using a transmitted code. Determining a position through code phase resolution usually results in position accuracy measured in meters.

Carrier phase measurement may be used when greater GPS accuracy is needed. Carrier phase measurement involves measuring the distance between a GPS receiver and a transmitting GPS satellite by using a transmitted carrier frequency. Errors in position calculation occur, however, when there is a discontinuity in the measured carrier phase. This discontinuity may result from a temporary loss in the carrier tracking loop of a GPS receiver, satellite blockage, jamming, clock noise, or for other reasons. The loss of carrier may result in a temporary loss of location information. This temporary loss of location information is not acceptable in some critical applications.

One way of providing accurate location information, which eliminates the problem of temporary carrier loss, is to use an inertial navigation system (INS). Inertial navigation systems typically measure change in position through mechanical devices such as accelerometers, gyroscopes or other motion-sensing devices. One advantage of INS is that it requires no external references in order to determine its position. A disadvantage is that error accumulates in an IMS system as time passes. An INS system may be minutely inaccurate over a very short time period, but the longer INS is used to determine position the less accurate the system becomes. For critical applications, a system that exhibits temporary loss of position or a system that accumulates error over time does not provide sufficiently accurate position information.

SUMMARY

The invention in one implementation encompasses an apparatus. The apparatus comprises a position system configured to determine a global positioning (GPS) change vector, an inertial navigation system (INS) change vector. Further, the position system is configured to determine a relative position between a first platform and a second platform based on the GPS change vector and the INS change vector, and the position system is configured to correct a GPS position calculation error based on the GPS change vector and the INS change vector.

Another implementation of the invention encompasses a method. The method comprising the steps of determining a GPS change vector and an INS change vector. The method also determines a relative position between a first platform and a second platform based on the GPS change vector and the INS change vector, and the method corrects a GPS position calculation error based on the GPS change vector and the INS change vector.

A further implementation of the invention encompasses a computer readable storage medium on which is embedded at least one computer program comprising a set of instructions to determine a GPS change vector and an INS change vector, determine a relative position between a first platform and a second platform based on the GPS change vector and the INS change vector, and correct a GPS position calculation error based on the GPS change vector and the INS change vector.

DESCRIPTION OF THE DRAWINGS

Features of example implementations of the invention will become apparent from the description, the claims, and the accompanying drawings in which:

DETAILED DESCRIPTION

As mentioned, when precise location resolution is needed for a critical application, location calculations based on GPS and INS each have shortcomings. In the case of GPS, a temporary loss of carrier detection may result in a temporary loss of accurate location information. In the case of INS, an error build up, which accumulates over time, is unacceptable in accurately determining a position of a vehicle involved in location critical operations.

A device that can provide accurate location information may be needed in a situation where two vehicles are trying to establish or maintain a constant separation. For example, when a tanker airplane refuels a drone airplane, a relative position between the two vehicles must be determined and the relative position must be known while the two vehicles are near each other. A loss of position information during a critical refueling period may have catastrophic consequences. Other examples where the accurate positioning of two vehicles is critical occurs when two ships approach each other to exchange supplies or fuel, or when two cars traveling next to each need to maintain a buffer zone. Cycle slip and accumulated error render GPS and INS insufficiently accurate for these applications.

One method of overcoming the deficiencies of the two systems is to combine INS and GPS to provide an accurate position measurement that does not accumulate error or suffer from temporary position loss due to cycle slip. This accurate system may be achieved by using an INS system to detect and correct GPS cycle slip.

Figure 1:
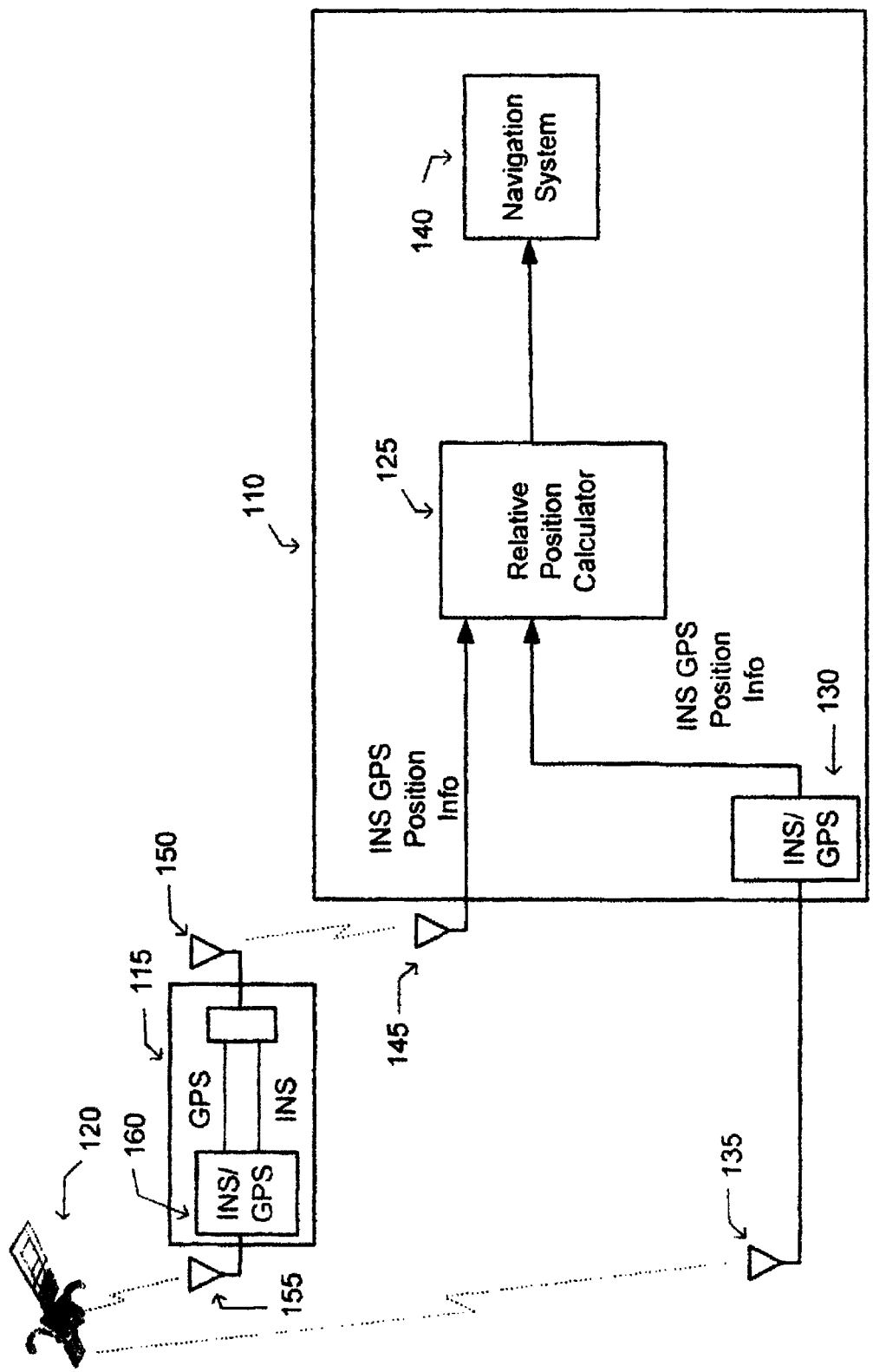
FIG. 1 is a representation of one implementation of an apparatus that comprises two platforms in communication where the platforms comprise a system for GPS cycle slip detection and repairing.

Turning to FIG. 1, an apparatus 100 in one example comprises two platforms 110, 115 that are in communication with each other and which are in communication with a GPS satellite 120. An illustrative description of operation of the apparatus 100 is presented, for explanatory purposes. In one example, a first platform 110 (platform 1) represents a flying drone, while the second platform 115 (platform 2), represents a tanker airplane. In other examples the platforms 110, 115 may represent two boats, two cars or other vehicles or objects that may be traveling in close proximity to each other.

The first platform 110 may further comprise a relative position calculator (RPC) or position system 125, a first hybrid GPS/INS navigation unit or navigation unit 130, a first GPS antenna 135, a first inter-vehicle communications antenna 145 and a navigation system 140. The first GPS antenna 135 may be in communication with the GPS satellite 120 and the first GPS/INS navigation unit 130. The first communications antenna 145 may be in communication with the second platform 115 via a second inter-vehicle communications antenna 150. The first communication antenna 145 may also be in communication with the RPC 125. The RPC 125 may be in communication with the navigation system 140, the first antenna 145 and the first INS/GPS navigation unit 130. Inter-vehicle communications may be accomplished via the antennas 145, 150 using a tactical targeting network technology (TTNT) or any other wireless communications protocol. In other embodiments the antennas 145, 150 may be replaced with a wired communications system or any other type of communication system that may be used to communicate between two platforms.

The RPC 125 may determine a position vector between the first platform 110 and the second platform 115. The position vector may represent a distance between a point of reference on the first platform 110 and a point of reference on the second platform 115. That is, the position vector may represent the distance between the two platforms 110, 115. The RPC 125 may communicate the position vector to the navigation system 140, and the navigation system 140 may adjust a position of the first platform 110 based on the position vector.

The first GPS antenna 135 may receive GPS satellite signals that may be used by a GPS system to determine a position of the GPS receiver in relation to the earth. The first hybrid INS/GPS navigation unit 130 may comprise a first GPS sensor, which determines position coordinates based on GPS signals received from the first GPS antenna 135. The first INS/GPS navigation unit 130 may further comprise a first INS sensor that may determine position coordinates based on motion sensing. The first INS/GPS navigation unit 130 may provide the RPC 125 with GPS and INS position coordinate updates. In an embodiment, the position coordinates may be represented by a three-dimensional coordinate system such as a local East, North Up (ENU) coordinate system or an Earth Centered Earth Fixed (ECEF) coordinate system. Different types of coordinate systems may be used in other embodiments.

The second platform 115 may further comprise a second GPS antenna 155, a second hybrid INS/GPS navigation unit 160, and the second inter-vehicle communications antenna 150. The second INS/GPS navigation unit 160 may be in communication with the second GPS antenna 155, and the second GPS antenna 155 may be in communication with the GPS satellite 120. The second INS/GPS navigation unit 160 may also be in communication with the second inter-vehicle communications antenna 150. The second inter-vehicle communications antenna 150 may be in communication with the first inter-vehicle antenna 145. The second GPS antenna 155 may receive GPS satellite signals that may be used by a GPS system to determine a position of the GPS system. The second hybrid INS/GPS navigation unit 160 may comprise a second GPS sensor, which may receive GPS signals from the second GPS antenna 155. The second INS/GPS navigation unit 160 may further comprise an INS sensor that may determine position coordinates based on motion sensing. The second INS/GPS navigation unit 160 may communicate GPS and INS position coordinate updates via the inter-vehicle communications antennas 145, 150 to the RPC 125.

The first platform 110 and the second platform 115 shown in FIG. 1 may be in motion. As the platforms 110, 115 move, they may move closer or further apart. In an embodiment, a three coordinate vector (position vector) may represent a distance between the two platforms 110, 115. In other embodiments, different vector coordinate systems may represent the distance between the two platforms 110, 115. As the platforms 110, 115 move, the first and second GPS antennas 135, 155 may receive GPS signals from the GPS satellite 120. The first INS/GPS navigation unit 130 may convert the GPS signals into first GPS position coordinates and communicate the first GPS position coordinates to the RPC 125. The second INS/GPS navigation unit 160 may also convert received GPS signals into second GPS position coordinates and communicate the second GPS position coordinates to the RPC 125. The first INS/GPS navigation unit 130 may also communicate first INS position coordinates to the RPC 125. And, the second INS/GPS navigation unit 160 may communicate second INS position coordinates to the RPC 125 via the first and second inter-vehicle communications antennas 145, 150.

As the vehicles move, the RPC 125 may receive INS and GPS position coordinates associated with the first platform 110 and the second platform 115. The position coordinates may be sent at regular time intervals. Thus the RPC 125 may receive INS and GPS position coordinates at time t0, t1, t2, etc. In an embodiment, position coordinates may be sent every half second. Thus, the RPC 125 may receive INS and GPS coordinate updates for the first platform 110 and the second platform 115 every half second.

Upon receipt of a set of position coordinates, the RPC 125 may determine a position vector that represents the relative position of the first platform 110 to the second platform 115. For example, at time t0 the RPC 125 may be receive GPS position coordinates from the first platform 110 and the second platform 115. With the GPS position coordinates received at time t0, the RPC 125 may determine a first GPS position vector that may represent a relative position of the first platform 110 to the second platform 115 at time t0. At time t0 the RPC 125 may also receive INS position coordinates from the first platform 110 and the second platform 115. With the INS position coordinates received at time t0, the RPC 125 may determine a first INS position vector that may represent a relative position of the first platform 110 in relation to the second platform 115 at time t0. Thus, at time t0 the RPC may determine and store two position vectors, a first GPS position vector and a first INS position vector. The first GPS position vector may represent the relative distance between the first platform 110 and the second platform 115 as determined at time t0 by the GPS sensors. The first INS position vector may represent the relative distance between the first platform 110 and the second platform 115 as determined at time t0 by the INS sensors.

At time t1, the RPC 125 may receive another set of GPS and INS position coordinates. From the set of coordinates received at time t1 the RPC 125 may determine a second GPS position vector and a second INS position vector. The second GPS position vector may represent a distance between the platforms 110, 115 at time t1 as determined through GPS measurements, and the second INS position vector may represent a distance between the platforms 110, 115 at time t1 as determined through INS measurements.

Further, a first difference or change (Δ) between the GPS position vectors at time t0 and time t1 may be determined by, for example, subtracting the first GPS position vector from the second GPS position vector. The result may be a first GPS change vector which represents the amount the two platforms 110, 115 moved relative to each other between time t0 and time t1 as determined through GPS calculations. Similarly, a first INS change vector may be determined by, for example, subtracting the first INS position vector from the second INS position vector to determine a first INS change vector which represents the amount the two platforms 110, 115 moved relative to each other between time t0 and time t1 as determined through INS calculations.

If the first GPS change vector is approximately equal to the first INS change vector, the second GPS position vector may be communicated to the navigation system 140 where the second GPS position vector represents the current position of the first platform 110 relative to the second platform 115 at time t1. Based on the second GPS position vector, the navigation system 140 may make any necessary navigational corrections needed by the first platform 140.

If the first GPS change vector is not approximately equal to the first INS change vector, the change in the relative distance between the platforms 110, 115 as determined through GPS coordinate calculations may be different as determined through INS coordinate calculations. Thus, cycle slip or a GPS position calculation error may have occurred, which may be the cause of the discrepancy between the INS measurement and the GPS measurement. As previously mentioned, an INS system provides measurements with very small error over short time intervals. Thus, if the first GPS change vector does not provide an approximately equal result as the first INS change vector, the first INS change vector may be used to correct the first GPS change vector. To correct the first GPS change vector, the first INS change vector may be added to the first GPS position vector to determine a corrected second GPS position vector, which may be used as the second GPS position vector for future change vector calculations.

The cycle of receiving position coordinates and calculating position vectors and change vectors may continue for subsequent future time intervals. Thus, for example, at time interval t2, the RPC 125 may receive position coordinates from the first and second INS/GPS navigation units 130, 160. The RPC 125 may calculate a third GPS position vector, a third INS position vector, a second GPS change vector and a second INS change vector based on the GPS and INS position coordinates received for time t2 and t1. The RPC 125 may perform compare the second INS change vector and the second GPS change vector, and perform cycle slip detection and correction as described above. This may continue for time intervals t3, t4, etc.

Figure 2:
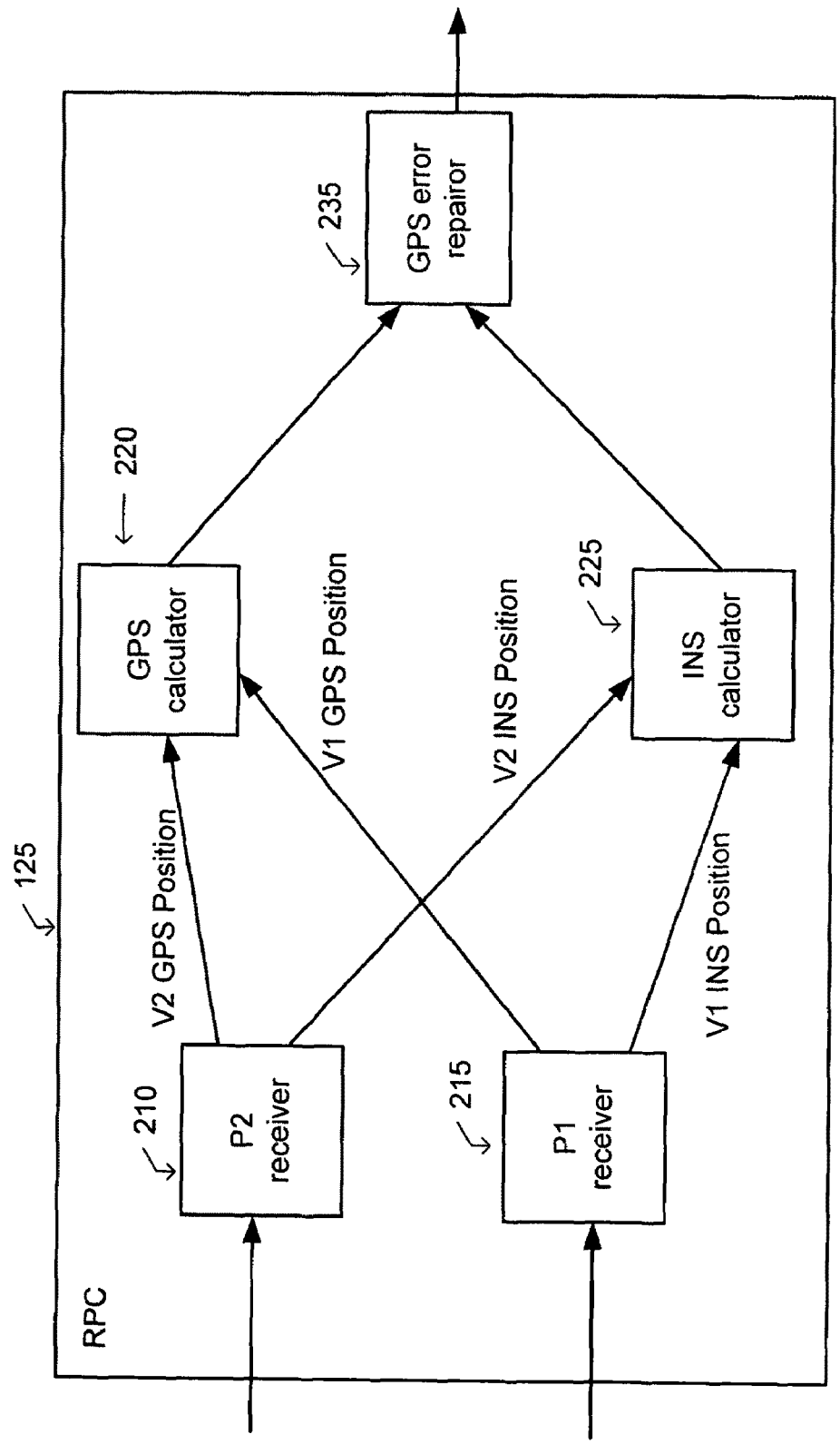
FIG. 2 is a representation of one implementation of a relative position calculator, which may perform GPS cycle slip detection and repairing.

Turning to FIG. 2, an apparatus 125 in one example comprises a P2 receiver 210, a P1 receiver 215, a GPS calculator 220, an INS calculator 225, and a GPS error repairor (GER) 235. An illustrative description of operation of the apparatus 125 is presented, for explanatory purposes. The apparatus 125 illustrated in FIG. 2 may be the RPC 125 as shown in FIG. 1.

The P1 receiver 215 may be communicatively coupled with the GPS calculator 220 and the INS calculator 225. The P2 receiver 210 may be communicatively coupled with the GPS calculator 220 and the INS calculator 225. The GPS calculator 220 and the INS calculator 225 may be further communicatively coupled with the GPS error repairor 235.

The P1 receiver 215 may receive INS and GPS position coordinates from a first platform, the P2 receiver 210 may receive INS and GPS position coordinates from a second platform. The coordinates received by the P1 and P2 receivers 210, 215 may arrive at regular time intervals. For example, the receivers 210, 215 may receive position coordinates at time t0, t1, t2, etc. In an embodiment, the time intervals may be half-second intervals. In other embodiments, the time intervals may be smaller or larger.

The P2 receiver 210 may communicate received INS position coordinates to the INS calculator 225 and the P2 receiver 210 may communicate received GPS position coordinates to the GPS calculator 220. The P1 receiver 215 may communicate received INS position coordinates to the INS calculator 225 and the P1 receiver 215 may communicate received GPS position coordinates to the GPS calculator 220.

The GPS calculator 220 may compute a GPS position vector from received GPS position coordinates and communicate the GPS position vector to the GER 235. The INS calculator 225 may compute an INS position vector from received INS position coordinates and communicate the INS position vector to the GER 235. The GER 235 may perform cycle-slip detection and repair using received GPS position vectors and INS position vectors.

As described in relation to FIG. 1, the cycle of determining GPS position vectors and INS position vectors may continue for each time interval. The calculators 220, 225 may receive updated position coordinates at regular time intervals and compute position vectors at regular time intervals. For example, the GPS calculator 220 may compute a first GPS position vector and the INS calculator 225 may compute a first INS position vector at time t0. These position vectors may be communicated to the GER 235. At time t1, the GPS calculator 220 may compute a second GPS position vector and the INS calculator 225 may compute a second INS position vector. The second GPS and second INS position vectors may also be communicated to the GER 235.

The GER 235 may determine a first INS change vector and a first GPS change vector as described above. Also, as previously described, if the first INS change vector is not approximately equal to the first GPS change vector, the GPS error repairor 235 may use the first INS change vector to correct the first GPS position vector. This cycle of calculating GPS and INS position vectors, and calculating GPS and INS change vectors may continue for subsequent time intervals. Thus, at time t3 a third position GPS position vector and a third INS position vector may be calculated. Also, a second INS change vector and a second GPS change vector may be computed at time t3. Again, as described above, the second INS change vector may be used to correct the second GPS position vector if the second INS change vector is not approximately equal to the second GPS change vector.

Figure 3:
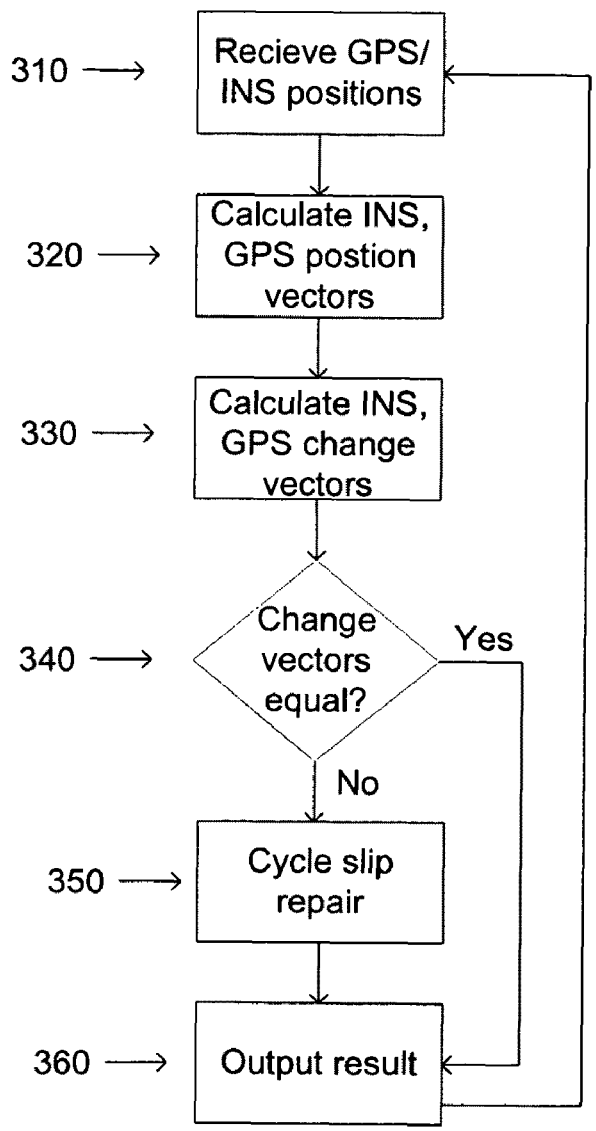
FIG. 3 is a representation of flow chart depicting a method for GPS cycle slip detection and repairing.

Turning now to FIG. 3, which depicts one example of a flow chart that illustrates an embodiment of a method 300 of cycle slip detection and repairing. An illustrative description of operation of the method 300 is presented for explanatory purposes. In step 310, the method 300 receives GPS and INS position coordinates. These coordinates may be received at regular time intervals. For example, coordinates may be received at time intervals t0, t1, t2, etc. At each time interval, the method 300 may receive position coordinates related to a first platform and a second platform.

In step 320, an INS position vector and a GPS position vector are calculated based on received position coordinates. A first INS position vector and a first GPS position vector may be calculated at time t0. A second INS position vector and a second GPS position vector may be calculated at time t1.

A first INS change vector and a first GPS change vector are calculated in step 330. The first INS change vector may be determined by subtracting the first INS position vector from the second INS position vector, and the first GPS change vector may be determined by subtracting the first GPS position vector from the second GPS position vector. In step 340, the first INS change vector and the first GPS change vector are compared. If the change vectors are approximately equal, the second GPS position vector may be output to a navigation unit 360 to be used in vehicle navigation.

If the vectors are not approximately equal, GPS error or cycle slip may be repaired 350. The cycle slip may be repaired as described above by adding the first INS change vector to the first GPS position vector to arrive at corrected second GPS position vector. After the cycle slip is repaired 350, the corrected second GPS position vector may be output to the navigation unit 360 and more GPS and INS position coordinates may be received 310.

The steps or operations described herein are just for example. There may be many variations to these steps or operations without departing from the spirit of the invention. For instance, the steps may be performed in a differing order, or steps may be added, deleted, or modified.

In an alternative embodiment the RPC 125 may be configured to determine an absolute position of a platform as well as the relative distance between two platforms. An embodiment in which the RPC 125 is configured to determine the absolute position of the first platform 110 is discussed for explanatory purposes only.

When determining an absolute position of the first platform 110 the RPC 125 may receive position coordinate updates from the P1 receiver 215 and the P2 receiver 210, or the RPC 125 may receive position coordinate updates from solely the P1 215 receiver. As discussed, the position coordinate updates may be received at regular time intervals. For example, the RPC 125 may receive position coordinates at time t0, t1, t2, etc. In an embodiment, the RPC 125 receives position coordinates every half-second. In other embodiments position coordinates may be communicated to the RPC 125 in shorter or longer time intervals.

Upon receipt of position coordinates the P1 receiver 215 may forward the GPS position coordinates to the GPS calculator 220 and INS position coordinates to the INS calculator 225. If the GPS calculator 220 and the INS calculator 225 are configured to determine a relative distance between two platforms, the GPS calculator and INS calculator 225 may use the updated position coordinates to determine a GPS position vector and an INS position vector. Regardless of how the GPS calculator is configured, the GPS calculator 220 and the INS calculator 225 may forward any position coordinate updates to the GPS error repairor 235.

In this example, the GPS error repairor 235 may store INS and GPS position coordinates received at time t0. When the GER 235 receives INS and GPS position coordinates at time t1, the GER 235 may compare the GPS position coordinates received at time t0 with the GPS position coordinates received at time t1 to determine a GPS coordinate change, where the GPS coordinate change may represent an amount the platform moved from time t0 to time t1 as determined from GPS measurements. The GPS coordinate change may be represented as a GPS change vector. When the GER 235 receives INS position coordinates at time t1, the GER 235 may also compare the INS position coordinates received at time t0 with the INS position coordinates received at time t1 to determine an INS coordinate change. The INS coordinate change may be represented as an INS change vector. The GPS coordinate change may represent an amount the platform moved from time t0 to time t1 as determined from GPS measurements, and the INS coordinate change may represent an amount the platform moved from time t0 to time t1 as determined from INS measurements.

If the GPS and INS coordinate changes are approximately equal, the GPS position coordinates may be used as an absolute position as determined by GPS measurements at time t1. If the GPS coordinate change and the INS coordinate change is not approximately equal, the INS coordinate change may be added to the GPS coordinates received at time t0 to arrive at corrected second GPS coordinates. The corrected second GPS position coordinates may be the absolute position of the platform at time t1 and the corrected second GPS position coordinates may be used in future calculations as the GPS coordinates determined at time t1.

The corrected second GPS position coordinates may be forwarded to the navigation system 140 and a position of the platform 110 may be adjusted accordingly. The cycle of sending INS and GPS position coordinates to the GER 235 at half second intervals may continue. Thus the GER 235 may calculate an absolute position at t1, t2, t3, etc., and the navigation system 140 may adjust the position of the platform 110 in response to the position updates.

The apparatus 100, 125 in one example comprises a plurality of components such as one or more of electronic components, hardware components, and computer software components. A number of such components can be combined or divided in the apparatus 100, 125. An example component of the apparatus 100, 125 employs and/or comprises a set and/or series of computer instructions written in or implemented with any of a number of programming languages, as will be appreciated by those skilled in the art. The apparatus 100, 125 in one example comprises any (e.g., horizontal, oblique, or vertical) orientation, with the description and figures herein illustrating one example orientation of the apparatus 100, 125 for explanatory purposes.

The apparatus 100, 125 in one example employs one or more computer-readable signal-bearing media. The computer-readable signal-bearing media store software, firmware and/or assembly language for performing one or more portions of one or more implementations of the invention. The computer-readable signal-bearing medium for the apparatus 100, 125 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first navigation unit associated with a first platform and comprising a first global position system (GPS) sensor configured to provide first GPS position coordinates and a first INS sensor configured to provide first INS position coordinates;
a second navigation unit associated with a second platform and comprising a second GPS sensor configured to provide second GPS position coordinates and a second INS sensor configured to provide second INS position coordinates;

a position system coupled to the first and second navigation units, configured to determine a GPS change vector from said first GPS position coordinates and said second GPS position coordinates, and an inertial navigation system (INS) change vector from said first INS position coordinates and said second INS position coordinates;

wherein the first and second GPS position coordinates and the first and second INS position coordinates indicate a relative position between a first platform and a second platform; and wherein the position system is configured to correct a GPS position calculation error based on the GPS change vector and the INS change vector.

2. The apparatus of claim 1, wherein:
a first GPS position vector is determined based on the first GPS position coordinates and second GPS position coordinates, a first INS position vector is determined based on the first INS position coordinates and second INS position coordinates;
the GPS change vector is determined based on the first GPS position vector and a second GPS position vector, the INS change vector is determined based on the first INS position vector and a second INS position vector.

3. The apparatus of claim 2 wherein;
the first GPS position coordinates, the first INS position coordinates, the second GPS position coordinates and the second INS position coordinates are received based on a time interval;
the time interval begins at time t0 and ends at time t1; and
the first GPS position vector is determined at time t0, the fust INS position vector is determined time t0, the second GPS position vector is determined at time t1, and the second INS position vector is determined at time t1.

4. The apparatus of claim 2 wherein the first platform is in motion and the second platform is in motion.

5. The apparatus of claim 2 wherein the position system is configured to correct the GPS position calculation error if the GPS change vector is not approximately equal to the INS change vector.

6. The apparatus of claim 5 wherein the GPS position calculation error is corrected by adding the INS change vector to the first GPS position vector to arrive at a corrected GPS position vector.

7. The apparatus of claim 6 wherein the INS change vector and the GPS change vector are determined approximately every half second.

8. The apparatus of claim 2 wherein the first navigation unit is within the first platform and the second navigation unit is within the second platform.

9. The apparatus of claim 8 wherein the second navigation unit is configured to communicate GPS position coordinates and INS position coordinates to the position system where the position system resides within the first navigation unit.

10. The apparatus of claim 1 further comprising:
a first receiver that is communicatively coupled with an INS calculator and a GPS calculator;
a second receiver that is communicatively coupled with the INS calculator and the GPS calculator;
the GPS calculator is communicatively coupled with a GPS error repairor;
the INS calculator is communicatively coupled with the GPS error repairor;
the GPS error repairor is configured to correct the GPS position calculation error based on the GPS change vector and the INS change vector.

11. The apparatus of claim 10 wherein:
the first receiver receives first GPS position coordinates and first INS position coordinates approximately every half second;
the first receiver communicates the first GPS position coordinates to the GPS calculator and the first receiver communicates the first INS position coordinates to the INS calculator;
the second receiver receives second GPS position coordinates and second INS position coordinates approximately every half second;
the second receiver communicates the second GPS position coordinates to the GPS calculator and the second receiver communicates the second INS position coordinates to the INS calculator;
the GPS calculator is configured to determine a first GPS position vector, a second GPS position vector and a GPS change vector;
the GPS calculator is configured to communicate the first GPS position vector, the second GPS position vector and the GPS change vector to the GPS error repairor;
the INS calculator is configured to determine a first INS position vector, a second INS position vector and an INS change vector;
the INS calculator is configured to communicate the first INS position vector, the second INS position vector and the IIS change vector to the GPS error repairor; and
the GPS error repairor is configured to correct the GPS position calculation error by adding the INS change vector to the first GPS position vector to determine a corrected second GPS position vector if the INS change vector is not approximately equal to the GPS change vector.

12. A method comprising the steps of:
receiving first GPS position coordinates and first INS position coordinates from a first navigation unit, said first navigation operatively coupled to a first platform and comprising a GPS sensor and an INS sensor;
receiving second GPS position coordinates and second INS position coordinates from a second navigation unit, said second navigation operatively coupled to a second platform and comprising a GPS sensor and an INS sensor;
determining a GPS change vector from the first and second GPS position coordinates and an INS change vector from the first and second INS position coordinates;
determining a relative position between the first platform and the second platform based on the GPS change vector and the INS change vector; and
correcting a GPS position calculation error based on the GPS change vector and the INS change vector.

13. The method of claim 12 wherein the first platform is communicatively linked with the second platform, and where the second platform communicates INS position coordinates and GPS position coordinates to the first platform.

14. The method of claim 13 wherein a first GPS position vector is calculated at time t0, a second GPS position vector is calculated at time t1, a first INS position vector is calculated at time t0, a second INS position vector is calculated at time t1;
the GPS position calculation error is corrected if the INS change vector is not approximately equal to the GPS change vector; and
the GPS position calculation error is corrected by adding the INS change vector to the first GPS position vector to arrive at a corrected second GPS position vector.

15. The method of claim 14 where the first platform and the second platform are in motion.

16. A computer readable storage medium on which is embedded at least one computer program comprising instructions executable by the computer to perform the method steps of:
  receiving first GPS position coordinates and first NS position coordinates from a first navigation unit, said first navigation operatively coupled to a first platform and comprising a GPS sensor and an INS sensor;
  receiving second GPS position coordinates and second INS position coordinates from a second navigation unit, said second navigation operatively coupled to a second platform and comprising a GPS sensor and an INS sensor;
  determining a GPS change vector from the first and second GPS position coordinates and an INS change vector from the first and second INS position coordinates;
  determining a relative position between a first platform and a second platform based on the GPS change vector and the INS change vector; and
  correcting a GPS position calculation error based on the GPS change vector and the INS change vector.

17. The computer readable storage medium of claim 16 wherein the method further comprises the steps of:
  determining a first GPS position vector at time t0, a second GPS position vector at time t1, a first INS position vector at time t0 and a second INS position vector at time t1; and
  correcting a GPS position calculation error if the INS change vector is not approximately equal to the GPS change vector where the GPS position calculation error is corrected by adding the INS change vector to the first GPS position vector to arrive at a corrected second GPS position vector.

18. The computer readable storage medium of claim 17 wherein the method further comprises the steps of: determining a GPS change vector and an INS change vector approximately every half second.

19. The computer readable storage medium of claim 16 wherein the method further comprises the steps of: determining an absolute position of a platform.

20. The computer readable storage medium of claim 19 wherein the method further comprises the steps of:
  receiving first GPS position coordinates at time t0, receive second GPS position coordinates at time t1, receive first INS position coordinates at time t0, receive second INS position coordinates at time t1;
  determining a GPS coordinate change and an INS coordinate change;
  correcting the second GPS position coordinates if the GPS coordinate change is not approximately equal to the INS coordinate change, where the second GPS coordinates are corrected by adding the INS coordinate change to the first GPS position coordinates to arrive at a corrected second GPS position coordinates.

* * * * *